Patented Nov. 13, 1945

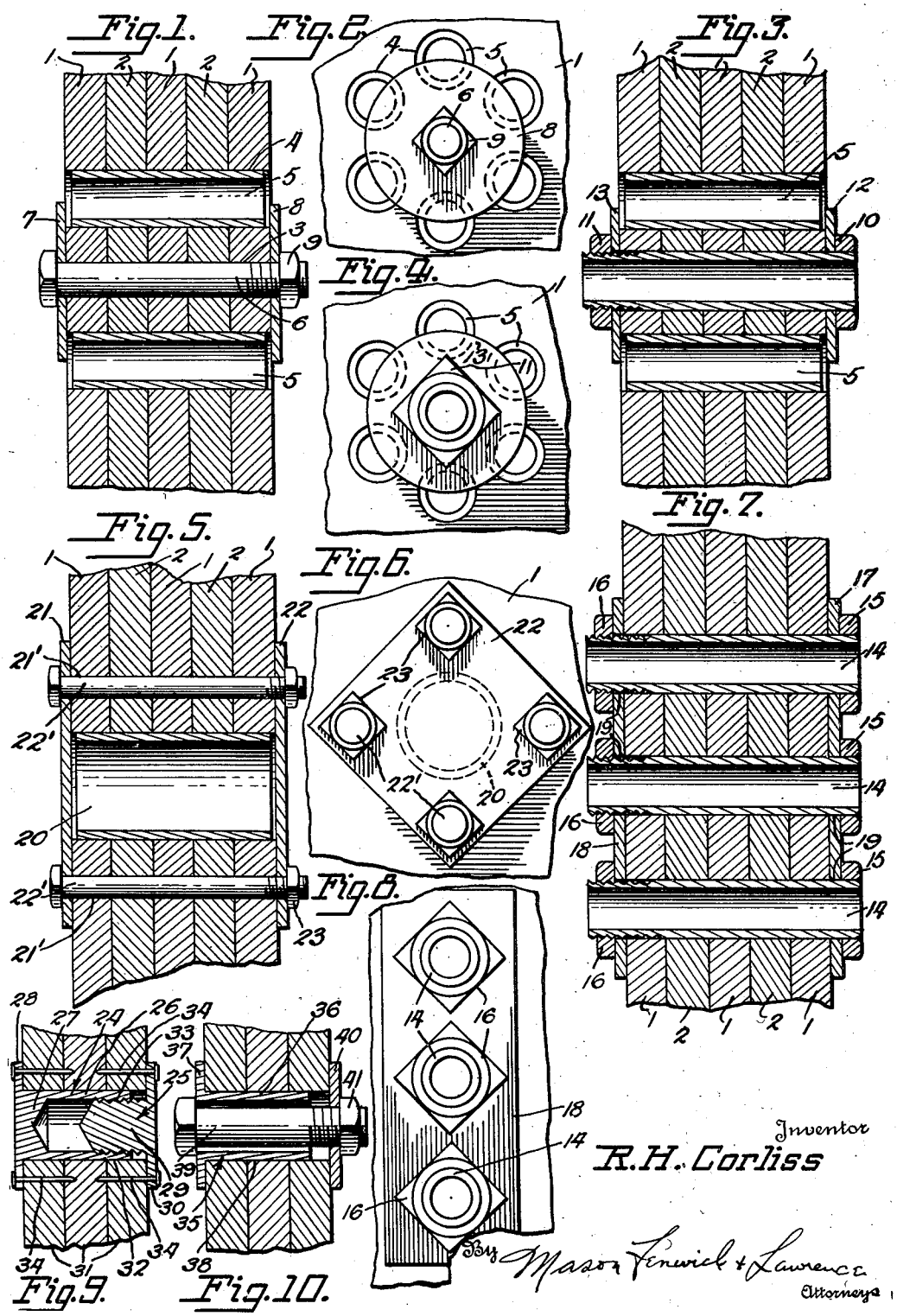

2,388,954

UNITED STATES PATENT OFFICE 2,388,954

CONNECTOR

Raymond H. Corliss, Washington, D. C., assignor of one-half to James Papanicolas, Washington, D. C.

Application July 20, 1943, Serial No. 495,474

7 Claims. (Cl. 20—92)

This invention relates to a method and means for making rigid connections between sections of material. The invention is particularly adapted for use in building timber trusses, although not limited to such use.

The old method of building trusses with solid timbers and steel gusset plates on either side of the timbers at the joints connected together by means of bolts passing through the timbers made an extremely heavy, bulky, and expensive job. The bulk required for a timber structure depended upon the amount of timber necessary to produce a sound jointing. Consequently, over-designing to ensure an efficient joint was the rule, with a resultant tremendous waste of material.

Later, metal timber connectors appeared on the market which enabled the assembly of spaced wooden members into trusses at a great saving in material and money. The resultant truss is considerably lighter in weight than the old form and much less bulky. Lapped joints are used and the connectors are usually in the form of rings or fittings which are embedded in the meeting faces of two members to bear the load and take the shear stresses. A bolt passes through the members and the ring to hold the assembled joint together. With the advent of the timber connectors, much of the waste under the old system of design was eliminated, as trusses could be fashioned closely approximating 100 per cent efficiency. Many new uses for timber were developed and designs thought possible only with other materials were found to be readily adaptable to the use of wood.

There are, however, several ways in which the known connectors fail to accomplish the desired result. The rings or fittings which seat in grooves or depressions in the wood are usually of slight width relative to the thickness of the wood, and generally extend into the wood one-third or less of the total thickness of the wood. Often the ring will compress the wood under load and move out of alignment, widening the groove or depression and subjecting the bolt to the bending stress of the load. This considerably weakens the joint and makes it impossible to tighten the joint to compensate for shrinkage of the wood. Furthermore, the slight surface frictional hold which the rings or fittings have with the wood is insufficient to aid, to any extent, in preventing the joined timbers from moving apart when shrinkage has occurred, thus putting the shearing as well as the bending stresses upon the bolt.

In fabricating a truss or other structure using metal connectors, the various members are usually laid in place and by the use of templates the members are marked for drilling. They may be drilled while set up in position and the members then separated to cut the required grooves or depressions in which the rings or other fittings are to be seated. The fittings are then placed in position and the members reassembled and bolted into place.

The object of the present invention is to provide a method and means for connecting members which provides a joint of comparable strength to one employing the known types of metal connectors and of extreme light weight, or one of comparable weight to the known joints but of improved strength.

Another object is a method of forming joints whereby all parts of a structure may be assembled and clamped together on the ground and the joint completed without the necessity of moving or disassembling the members.

A further object is to provide means forming a connector which will resist all of the combined stresses of bending, compression, tension, and shear, a plurality of which may be grouped and arranged more compactly and efficiently than is possible with other known connectors.

A still further object of the invention is to provide means for connecting timbers or other members whereby standard or stock sizes of fittings are eliminated and connections may be made on the job using material which is available to meet the requirements of the specific job at hand.

With these and other objects in view which will appear from the following detailed description of preferred and practical embodiments of the invention taken in conjunction with the accompanying drawing which forms a part of this specification, the invention resides in the combination and arrangement of parts hereinafter described and claimed.

Referring to the drawing:

Figure 1 is a section through several members joined in the manner and by the means taught by the present invention;

Figure 2 is an elevational view of the structure shown in Figure 1;

Figure 3 is a sectional view similar to Figure 1, showing a different type of clamping means;

Figure 4 is an elevational view for the structure shown in Figure 3;

Figure 5 is a sectional view showing still another arrangement of the connector;

Figure 6 is a side elevation of Figure 5;

Figure 7 is a section through a joint showing the use of tie straps for distributing the load to all of the connector elements;

Figure 8 is a side elevation of the structure shown in Figure 7;

Figure 9 is a sectional view of a joint showing a connector embodying the principles of the present invention, which is adapted for use with light materials;

Figure 10 is a modification of the structure shown in Figure 9.

Before describing the invention in detail, it should be pointed out that the invention is based primarily upon the use of tubular members as connectors in various groupings and arrangements, the tubes being held in place and the joint members clamped together by stay bolts. It is well known in engineering that a pipe or tube ranks extremely high in section modulus value. Weight for weight, it is far superior to a solid section, and area for area and weight for weight, a tube has much greater resistance to lateral bending than a solid section. For example, a three-fourths inch diameter bolt has a cross-sectional area of .44 square inch. It has a section modulus value of .04. A 1¼" diameter tube with a wall ⅛" thick also has a cross-sectional area of .44 square inch. The tube, however, has a section modulus value of .11, almost three times as great as that of the bolt. Thus a tube can take the place of a bolt of much greater cross-sectional area and still support an equal load. Long bolts such as are necessary in truss joints will readily bend under the excessive stresses to which they are subjected, whereas tubular sections of equal weight and length will support several times the load.

Referring to the drawing in detail, Figures 1 and 2 show a number of thicknesses of material 1 and 2, the sections 1 being the spaced sections of one truss member and the sections 2 being of another truss member, the sections interfitting in alternation, and the lapping end sections of spaced members meeting in face to face contact at the joint, as is common in truss construction. In the particular arrangement shown, the members are first placed in lapped position, then clamped together and, with an extensible auger bit, a center hole 3 is drilled completely through the laminated structure. With the hole 3 as the center, a circle is described on the face of the outermost member and on this circle any desired number of points may be marked off as centers and the required number of holes 4 drilled. Lengths of tubing 5 are inserted into the holes 4, which holes are preferably slightly less in diameter than the outer diameter of the tubes. The tubes are driven into the openings, making a tight fit to ensure firm frictional contact with the sides of the opening of each of the members making up the joint. A bolt 6 carrying a washer 7 under its head is slipped through the opening 3, a washer 8 placed upon the bolt on the opposite face of the joint, and the connection tightened by means of a nut 9. The washers 7 and 8 are of such size that they overlap at least a portion of the openings 4 to prevent longitudinal movement of the tubes in the openings.

As practically all wooden structures are subject to shrinking, the tubes 5 are slightly less in length than the combined thickness of the members making up the joint, so that the nut 9 may be tightened from time to time to keep the truss members firmly in contact and maintain the surface friction between the members which materially reduces the load imposed upon the tubular sections. The tubes may, when the nuts are loose, carry the entire load of the joint. The tubes extend substantially the full width of the members and therefore produce a joint having maximum efficiency, as the broad surface contact and tight fit between the tubes and the members relieves the bolt of considerable tension strain, and the compression, bending, and shear strains are taken by the tubes.

In Figures 3 and 4 a slightly modified arrangement is shown which has the same circular placing of the tubes 5 but the central stay bolt is replaced by a tube having an annular member 10 welded or otherwise secured to one end to form a head, and having its other end threaded to receive a nut 11. Washers 12 and 13 are placed upon the bolt on either side of the joint similar to the washers 7 and 8. This form of connector is used where exceptional strength is required, the central clamping tube taking its share of the load. The weight of this form of connector is substantially the same as that shown in Figures 1 and 2, but it makes a considerably stronger joint.

That form of the invention shown in Figures 5 and 6 of the drawing is a reversal to those forms previously described, and intended for a lighter structure. Here a hole is drilled to receive a tube 20 and smaller holes 21 drilled in a cluster about the center opening to receive stay bolts 22. After the pipe 20 has been driven into the central opening, apertured plates 21 and 22 are placed on either side of the joint and bolts 22 slipped through the openings in the plate and the openings 21 in the joint members. Nuts 23 are threaded onto the bolts to clamp the structure in place. The plates 22 may be of metal, fiber, Masonite, or any other suitable material.

In Figures 7 and 8 a different arrangement is shown wherein each of the tubular members 14 is provided with a head 15 and threaded on its other end to receive a nut 16. Several of these tubes are put through the lapped truss members, preferably, although not necessarily, in alignment, and tie straps 17 and 18, having a series of openings 19 through which the tubes pass, are placed on the exterior faces of the outer members of the joint. Tie straps 17 and 18 serve to equalize the strain upon the tubes so that each of the tubes bear an equal portion of the load. In this instance if any undue strain is put upon one of the tubes, the strain is distributed by means of the tie straps to each of the other tubes.

In Figure 9 an adaptation of the inventive principles is shown which is particularly suited to use in very light structural work, or as a connector for sheets of material such as plywood, etc. This connector is formed in two parts, the female section 24 and a male portion 25. The section 24 comprises a tubular body 26 closed at one end, as at 27, and provided with a flange 28. The male member 25 is in the form of a threaded plug 29 carrying an enlarged flange 30 at its base. The members 31 which are to be joined are superimposed and an opening 32 drilled therethrough. The section 24 is then inserted into the opening and the member 25 threaded into the end of the tubular portion 26 which is provided with screw threads as at 33. The member 25 is turned up until the joint is tight and brads, nails or screws are then placed through openings 34 which are provided in the flange members 28 and 30 and into the wood. This prevents relative turning movement of the members 24 and 25, thus rigidly locking the connector in place.

Figure 10 shows an adaptation of the form shown in Figure 9, and comprises a flanged sleeve 35, having the sleeve portion 36 and the flange 37, which is adapted to be inserted in an opening 38 through the sections of material to be joined together. A bolt 39 carrying a washer 40 is then put through the member 35, the entire assembly being clamped together by a nut 41 threaded on the end of the bolt.

All of the forms shown are similar, as they all employ a tubular member to take the stresses that are imposed upon the joint, and all have some means for tying the entire assembly together, either a bolt or providing threads on the end of the tube to receive a nut.

When the forms of the invention shown in Figures 1 through 6 are used, it is not necessary that any special materials or fittings be purchased for a particular job, but stock pipe may be cut into sections of desired length to form the tubes. This greatly simplifies the construction job and enables the contractor to use the stock which he has on hand. If the stock available happens to be small, he may use the design shown in Figures 1 to 4, using sufficient sections of pipe in his cluster to give the desired strength to the joint. Of course, if an extremely heavy load is to be borne, several of these clusters may be placed in each joint. If the available stock is relatively large, a connection such as that shown in Figures 5 and 6 may be employed. It is, of course, understood that several of these may be used in a particular joint as has previously been the custom. The connectors shown in Figures 7 and 8 may also be formed on the job by cutting the tie straps to desired length and drilling the openings through which the tubes are to pass.

It is contemplated that the connectors shown in Figures 9 and 10 will be manufactured in sets and sold complete, ready for use. Such connectors as these may be used anywhere that a bolt is called for where exceptional strength is required, or extreme lightness is desirable. Either of these latter two forms would be extremely useful as connectors for sheets of plywood in the construction of aircraft.

Although several practical embodiments of the invention have been shown and described, it is to be understood that the invention is not to be limited to the precise showing, but only by the scope of the appended claims.

What I claim is:

1. A connector for joining sections of material comprising, a plurality of tubular members to be inserted through the sections of material to take the load stresses at the joint, said tubular members being of a length slightly less than the aggregate thickness of sections to be joined but greater than the aggregate thickness of the sections minus one section, a bolt for clamping the sections together, and means carried on either end of said bolt contacting the exterior faces of the outer of said joined sections and overlying at least a portion of the end of said tubular members whereby longitudinal movement of the tubular members is prevented.

2. A connector for joining sections of material comprising, a tubular member to be inserted through the sections of material to take the load stresses at the joint, said tubular member being of a length less than the aggregate thickness of the sections to be joined but greater than the aggregate thickness of the sections minus one section, a plurality of bolts for clamping the sections together and means carried by said bolts contacting the exterior faces of the outer of said joined sections and overlying said tubular member whereby longitudinal movement of the tubular member is prevented.

3. The method of connecting sections of material comprising, assembling the sections of material in proper position, boring clusters of holes through overlapped portions of the sections, inserting tubular members of less length than the aggregate thickness of the sections to be joined but greater than the aggregate thickness of the sections minus one section in some of said holes, inserting a bolt through at least one of said holes, and associating retaining means with said bolt overlying at least a portion of the end of each of said tubular members.

4. The method of connecting sections of material comprising, assembling the sections of material in proper position, boring clusters of holes through overlapped portions of the sections, inserting a tubular member of less length than the aggregate thickness of the sections to be joined but greater than the aggregate thickness of the sections minus one section in at least one of said holes, inserting bolts in the remainder of said holes, and associating retaining means with said bolts overlying at least a portion of the end of said tubular member.

5. A truss joint comprising a plurality of contacting adjacent sections of material having an opening passing completely therethrough and a cluster of openings about said first-mentioned opening, a tubular member inserted in at least one of said openings, said tubular member being of a length less than the aggregate thickness of the sections to be joined, but greater than the aggregate thickness of the sections minus one section, means inserted in the remainder of said openings to clamp the sections together and means carried by said clamping means contacting the exterior face of the outer of said joined sections and overlying at least a portion of the end of said tubular member whereby longitudinal movement of the tubular member is prevented.

6. A truss joint comprising a plurality of contacting adjacent sections of material having a plurality of openings passing completely therethrough, means inserted in at least one of said openings to clamp the sections together, tubular members inserted in the remainder of said openings, said tubular members being of a length less than the aggregate thickness of the sections of material to be joined but greater than the aggregate thickness of the sections minus one section, and means carried by the said clamping means contacting the exterior face of the outer of said joined sections and overlying at least a portion of the end of said tubular members whereby longitudinal movement of the tubular members beyond the face of the joined sections is prevented.

7. A truss joint as claimed in claim 6, said means carried by said clamping means comprising a washer to lie flush against the outer face of said joint and overlie at least a portion of the ends of said tubular members.

RAYMOND H. CORLISS.